United States Patent [19]
Buell et al.

[11] Patent Number: 5,226,674
[45] Date of Patent: Jul. 13, 1993

[54] CYCLE REAR SUSPENSION SYSTEM

[75] Inventors: Erik F. Buell, Mukwonago; Marc Muller, Waterford, both of Wis.

[73] Assignee: Schwinn Bicycle Company, Chicago, Ill.

[21] Appl. No.: 763,460

[22] Filed: Sep. 20, 1991

Related U.S. Application Data

[63] Continuation-in-part of Ser. No. 750,648, Aug. 27, 1991.

[51] Int. Cl.⁵ .................................................. B62K 25/04
[52] U.S. Cl. ................................... 280/284; 267/171; 280/283; 280/285; 280/288
[58] Field of Search ............... 280/283, 284, 285, 288; 207/171

[56] References Cited

U.S. PATENT DOCUMENTS

| | | | |
|---|---|---|---|
| 1,130,828 | 3/1915 | Kuehn | 280/284 |
| 1,412,012 | 4/1922 | Bruno | 280/284 |
| 2,132,317 | 10/1938 | Pease | 280/284 |
| 2,283,671 | 5/1942 | Finlay et al. | 280/284 |
| 2,446,731 | 8/1948 | Wheler | 280/284 |
| 3,942,821 | 3/1976 | Bock | 280/277 |
| 3,948,543 | 4/1976 | MacDonald et al. | 280/284 |
| 4,039,200 | 8/1977 | McGonegle | 280/284 |
| 4,046,396 | 9/1977 | Taylor et al. | 201/281 |
| 4,058,181 | 11/1977 | Buell | 180/32 |
| 4,186,936 | 2/1980 | Offenstadt et al. | 280/277 |
| 4,421,337 | 12/1983 | Pratt | 280/277 |
| 4,433,850 | 2/1984 | Miyakoshi et al. | 280/277 |
| 4,568,101 | 2/1986 | Bleustein et al. | 280/707 |
| 4,679,811 | 7/1987 | Shuler | 280/284 |
| 4,732,404 | 3/1988 | Coetzee | 280/283 |
| 4,789,174 | 12/1988 | Lawwill | 280/284 |
| 4,792,150 | 12/1988 | Groendal et al. | 280/275 |
| 4,815,763 | 3/1989 | Hartmann | 280/276 |
| 4,997,197 | 3/1991 | Shultz | 280/275 |
| 5,000,470 | 3/1991 | Kamler et al. | 280/275 |
| 5,014,808 | 5/1991 | Savard et al. | 180/219 |

FOREIGN PATENT DOCUMENTS

| | | |
|---|---|---|
| 155582 | 3/1954 | Australia . |
| 497017 | 2/1919 | France .................................. 280/284 |
| 923235 | 7/1947 | France . |
| 2395879 | 3/1979 | France . |
| 421518 | 5/1947 | Italy . |
| 4235515 | 7/1947 | Italy . |
| 540821 | 3/1956 | Italy . |
| 17336 | of 1913 | United Kingdom . |
| 24918 | 9/1918 | United Kingdom . |

*Primary Examiner*—Mitchell J. Hill
*Attorney, Agent, or Firm*—McCaleb, Lucas & Brugman

[57] ABSTRACT

A rear suspension system for a two wheel cycle such as a bicycle or motorcycle having a main frame which includes a rearwardly or downwardly inclined down tube. A vertically pivotable rear frame assembly includes a pair of swing arms which extend rearwardly from pivotal connections on the main frame. Rear wheel fitments are carried by the swing arms. A pair of elongated tubelike or rodlike chain stays extend forwardly from the rear fitments at a fixed angle relative to the swing arms. A tubular shock absorber assembly is supported on the down tube and has a spring urging a coupler portion thereof in a forward and upward direction. A double-pivoted link is pivotally connected between the forward ends of the chain stays and a bell crank assembly which is pivotally connected to the underside of the frame, and in turn, connects the double-pivoted link to the coupler portion of the shock absorber assembly. Upward impacts on the rear wheel are reacted on the main frame as a downward and rearward force with a largely downward force component so pitching motion at the rear end of the main frame is minimized when moving over ground or highway irregularities or rough terrain encountered in off road riding. In one embodiment, the shock absorber assembly is supported on the forward side of the down tube; in another embodiment, the shock absorber assembly is inside an open-rear-ended down tube.

25 Claims, 10 Drawing Sheets

CYCLE REAR SUSPENSION SYSTEM

CROSS-REFERENCE TO RELATED APPLICATION

This is a continuation-in-part of copending application Ser. No. 07/750,648 filed Aug. 27, 1991.

BACKGROUND OF THE INVENTION

Bicycles and motorcycles were originally built with rigid frames; As the horsepower, weight and speed of motorcycles increased, and they began to be used off road, both front and rear wheel suspensions were developed and have now reached a very high degree of sophistication. Today, the best motorcycle suspensions are exotic and highly effective combinations of oil dampers, compressed gas and steel springs, and elastopolymers with individual tuning adjustments for rebound and compression damping to optimize shock absorption for different weight riders and different riding conditions.

Although soft ride bicycle suspensions and components have been around for almost 100 years, mostly in experimental and show bikes, none have been manufactured in any significant quantities. Riders and manufacturers have resisted the added weight, cost, complexity and untraditional appearance of bicycles equipped with shock absorbing suspensions.

Recently, however, with the overwhelming popularity of mountain bikes, and off road riding and racing, the idea of equipping bicycles with soft ride suspensions has aroused wide interest. Riding a fully soft-suspended mountain bike down a rough, rock-strewn trail, or even level riding on city and country roads, demonstrates a new degree of safety and comfort. Downhill riding and racing can be speeded up with increased safety. On ordinary city and country roads, the rider can look forward to more safely view and react to traffic and road conditions ahead without paying disproportionate attention to stones and potholes immediately below. As examples of intense current interest in soft ride suspensions for bicycles, the entire February 1991 issue of Mountain Bike Action has been devoted to shock absorbing bike suspensions. Among other articles, there is a feature article with a complete comparison of what it describes as "The Seven Best New Suspension Bikes" plus many pages of miscellaneous information on soft ride suspensions and advantages thereof. Bicycling for April 1991 pages 84–98 has a feature article on shock absorbing suspensions entitled, "New Bicycle Suspensions".

SUMMARY OF THE INVENTION

The invention is an improved rear wheel suspension system, especially beneficial on mountain bikes but also useful on two wheel cycles generally including street and highway bicycles, and motorbikes. The system permits higher speed operation over rough terrain especially in downhill racing, with improved control. Upward impact on the rear wheel is reacted on the main frame in a very special way resulting in a largely downward force component, so that pitching motion at the rear end of the main frame is greatly reduced when moving over rough, off road terrain as well as the normal bumps and potholes encountered in street and highway riding.

Structurally, this suspension system has a tubular shock absorber assembly supported by the down tube. The shock absorber assembly has a load receiving coupler which is movable downwardly and rearwardly against a spring. A pivotally mounted rear frame assembly supports the rear wheel. The rear frame assembly comprises a pair of rearwardly extending swing arms pivotally connected at their forward ends to the main frame, and a pair of chain stays extending forwardly from the rear ends of the swing arms. Rear axle fitments are secured to the rear ends of the swing arms and corresponding chain stays on both sides. A double-pivoted link is pivotally connected between the forward ends of the chain stays and a bell crank assembly or equivalent connecting and guiding means which is supported on the underside of the main frame and, in turn, connects the double-pivoted link to the load-receiving coupler on the shock absorber assembly. Upward momentary impact load on the rear wheel and rear frame assembly deflects the shock absorber spring to resist the impact load in a direction which resists upward pitching of the cycle.

Inasmuch as the shock absorber and its spring are mounted on or in the down tube, preferably generally parallel thereto, upward impact load on the rear wheel and rear frame assembly deflects the shock absorber spring in a largely downward direction thereby reacting the impact load as a largely downward component on the main frame so pitching motion at the rear end of the main frame is greatly reduced when riding over uneven terrain, rocks, pebbles and potholes.

The chain stays used in this invention are substantially rigid elongated metal or composite tubes or rods which resist upward impact loads through a shock absorber uniquely positioned to provide a counteraction downward force component. This provides the unique advantage of enabling the cycle to bob gently over small bumps at slow speeds while providing a firmer ride over larger impacts at higher speeds.

BRIEF DESCRIPTION OF THE DRAWINGS

Other objects and advantages will be apparent from the accompanying drawings in which

FIG. 6 is a view similar to FIG. 2 showing adjustment of the rear suspension system for different size riders; FIG. 6 also shows in broken lines an example of initial upward deflection resulting from a rider's weight;

FIG. 7 is a fragmentary enlarged cross sectional view of a double-pivoted adjustment link shown in FIGS. 2, 3, 6 and 10;

Like parts are indicated by like reference numerals.

DESCRIPTION OF THE PREFERRED EMBODIMENT

Referring now in more detail to the embodiment shown in FIGS. 1-7, 8 and 9, a bicycle generally designated 20 incorporates a preferred form of the present invention.

Figure 1:
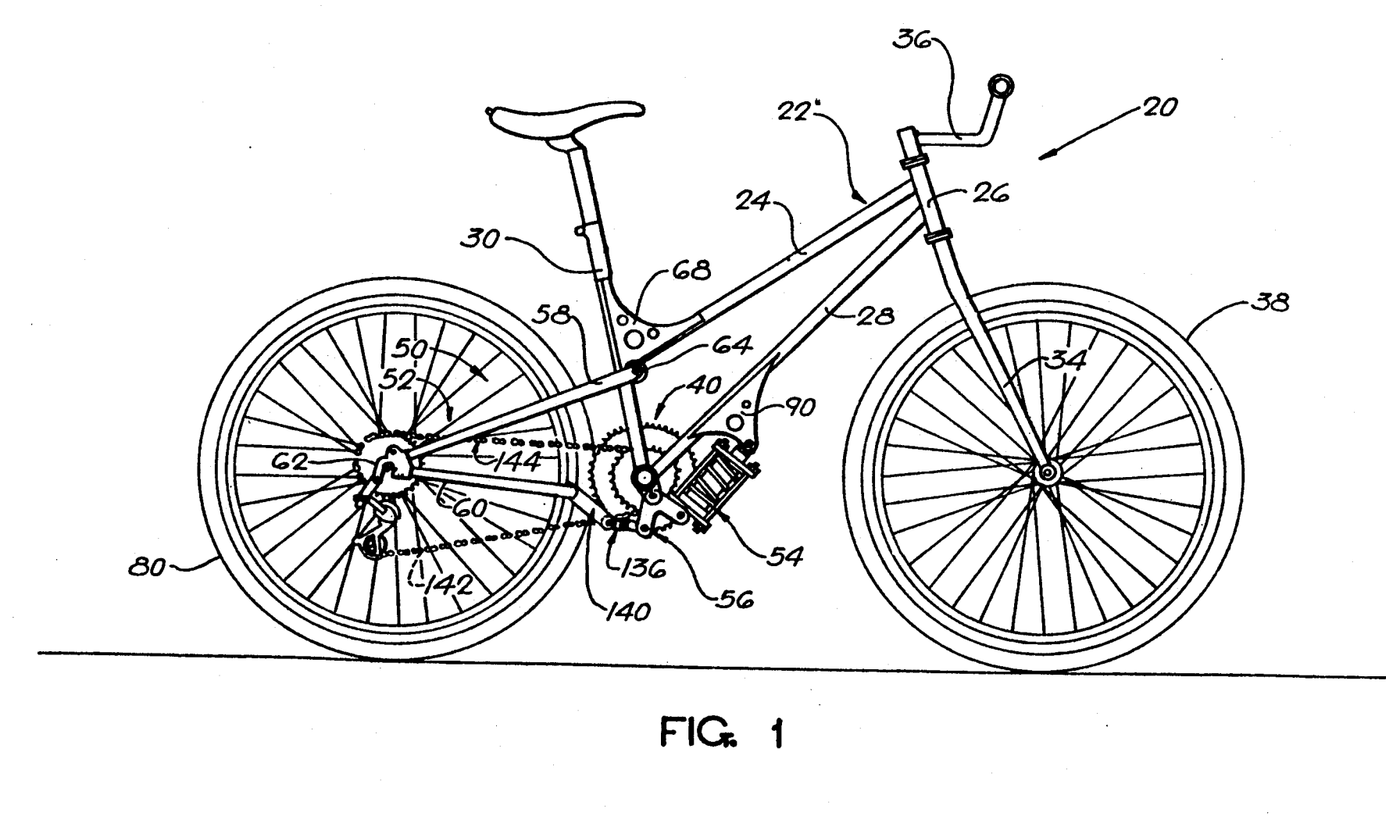
FIG. 1 is a right side elevational view of a bicycle incorporating a rear suspension system illustrating a preferred form of the present invention.

The bicycle 20 has a main frame 22 including an inclined top tube 24, a head tube 26, a down tube 28, a seat tube 30, and a bottom bracket shell 32. Fitted to the main frame are conventional components including a front fork 34, handlebar 36, front wheel 38, and a pedal and front sprocket assembly 40.

The soft ride rear suspension system of this invention is generally designated 50 and comprises a pivotal rear frame assembly 52, a shock absorber assembly 54, and connecting and guiding means 56.

The rear frame assembly 52 comprises a pair of swing arms 58, chain stay means comprising a pair of rigid chain stays 60, and rear fitments 62 which will now be described.

Figures 2, 2A:
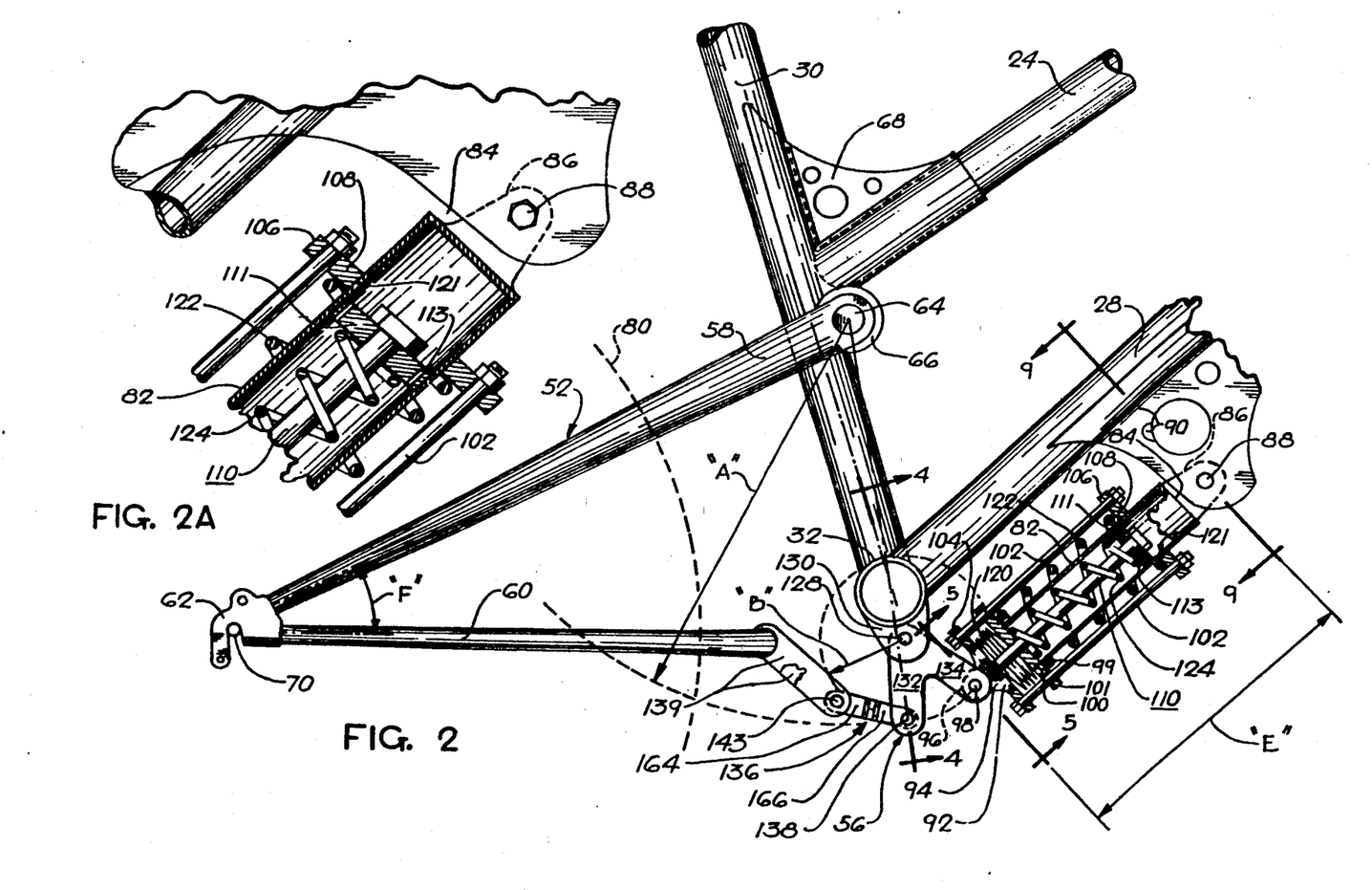
FIG. 2 is a fragmentary enlarged view of FIG. 1 showing the rear suspension system in an unloaded or a very lightly loaded position.
FIG. 2A is a further enlarged, fragmentary view of FIG. 2.
Figure 3:
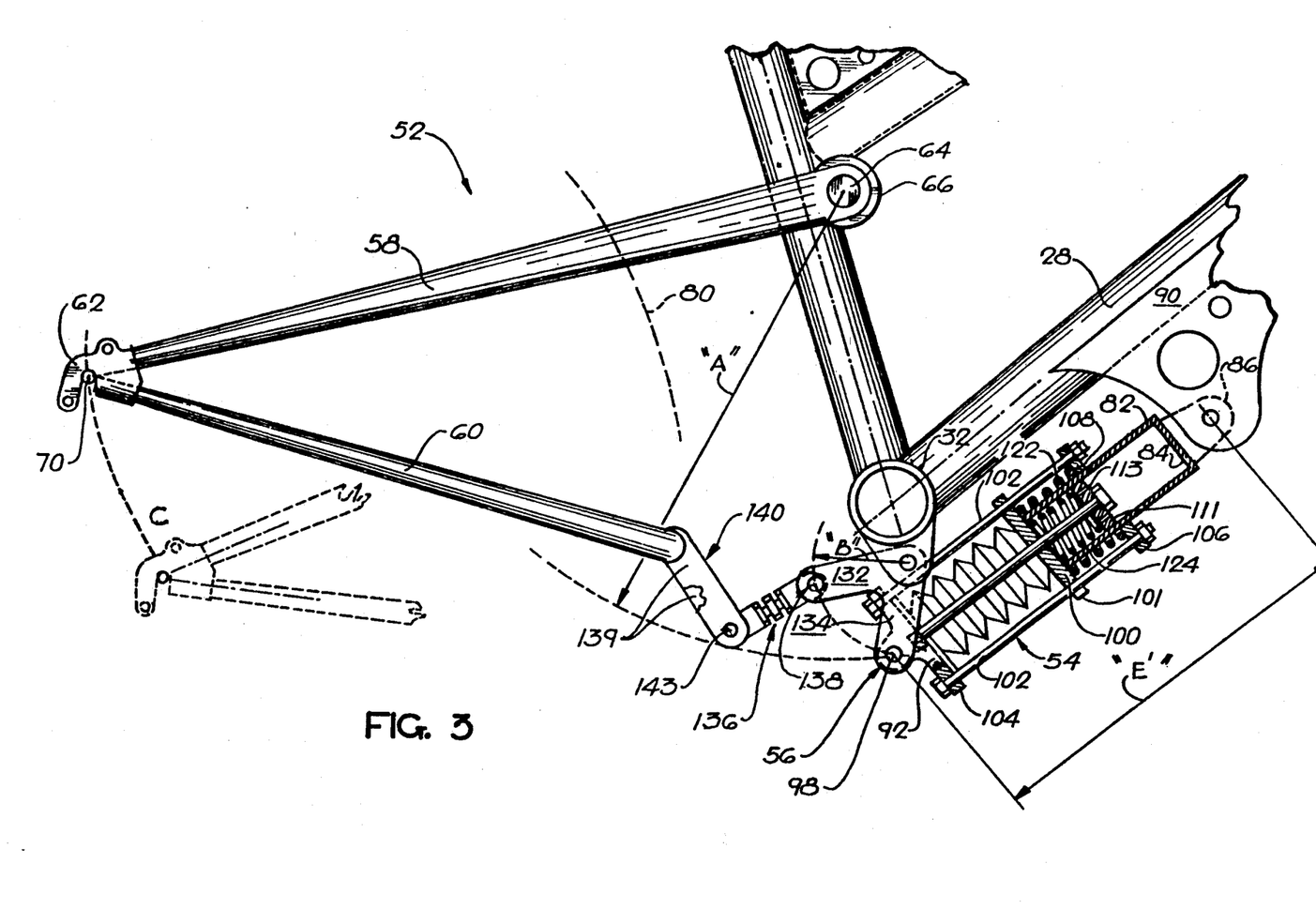
FIG. 3 is a view similar to FIG. 2 showing a loaded, impact-absorbing position.
Figure 3A:
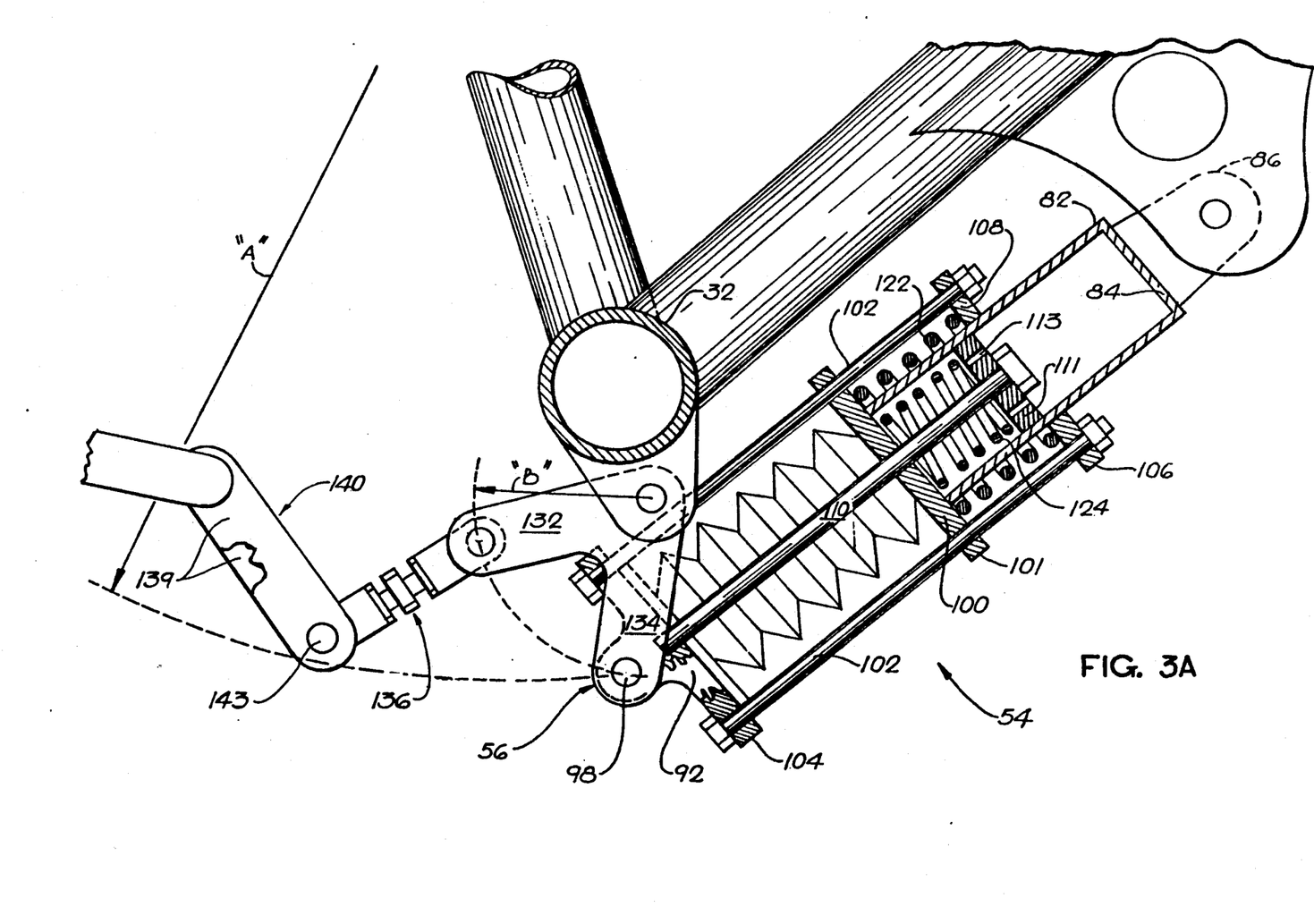
FIG. 3A is a fragmentary enlarged view of FIG. 3.
Figure 4:
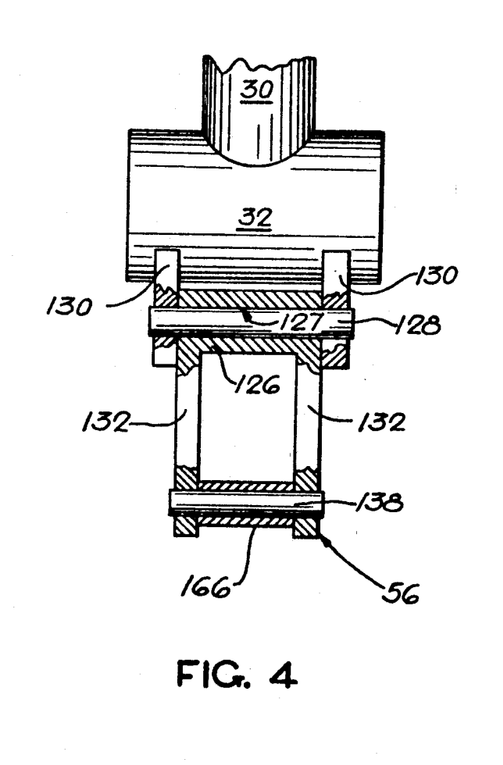
FIGS. 4 and 5 are fragmentary enlarged cross sectional views of FIG. 2 taken along lines 4—4 and 5—5 respectively.

As best shown in FIGS. 1, 2 and 3, the rearwardly extending swing arms 58 are pivotally connected at their front ends to the opposite sides of the main frame. They are swingable up and down about a pivot pin 64 extending through a bearing housing 66 which is welded to the seat tube 30 which in turn is welded to a triangular lug or bracket 68 secured as by welding to the seat tube 30 and top tube 24. The lug 68 strengthens the seat tube 30 to resist bending of the unsupported length above the junction with the top tube 24. Each swing arm 58 has at its rear end a corresponding one of the rear fitments 62 for a rear axle 70 of a rear wheel 80. This supports the rear wheel and rear frame assembly 52 for up and down shock absorbing swinging motion about the pivot pin 64 relative to the main frame 22.

Figure 9:
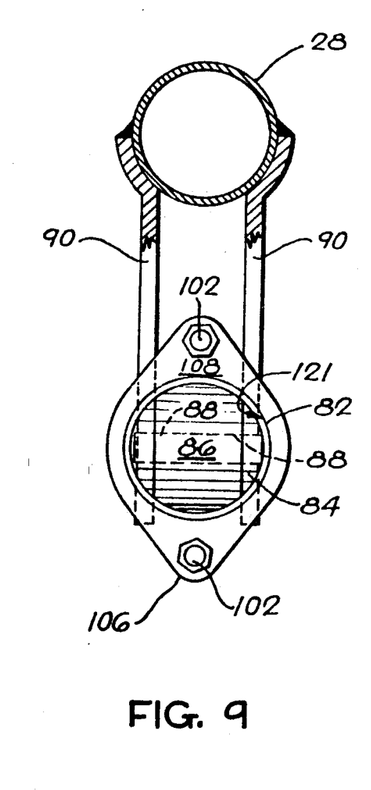
FIG. 9 is a cross sectional view of FIG. 2 taken along line 9—9.

The tubular shock absorber assembly 54 is mounted along the forward edge of the down tube 28. Any form of shock absorber may be used. The invention does not require any particular type. As shown in FIGS. 2, 3 and 9, the shock absorber assembly comprises a cylindrical body 82 closed at the top, forward end by an upper end cap 84 which has an upwardly and forwardly directed axial extension 86 pivotally mounted on a pin 88 extending between a pair of brackets 90, 90 secured as by welding to the forward side of down tube 28. At the rear, lower end, best shown in FIGS. 2, 2B and 5, an external coupling means generally designated 94 is movable in opposite directions for receiving and dampening impact forces generated by movements of the rear frame assembly. The coupling means comprises a transverse lower plate 92 having a rearward, downward draw bar extension 96 with a transverse pin 98 providing a pivotal connection to the connecting and guiding means 56 which comprises a bell crank to be described. The shock absorber assembly 54 comprises means for dampening movement of the rear suspension system through the coupling means 94.

A lower cap 100 seals the bottom end of cylinder 82. A pair of external tie bolts 102, 102 extend through diametrically opposed ears 104 and 106 on the lower plate 92 and an upper plate 108 respectively. The bolts are slidably guided within openings 99 in ears 101 on in the lower cap 100. A piston 111 with dampening apertures 113 or any other suitable dampening means to regulate the flow of liquid or gas through the piston is supported on a piston rod 110. Piston rod 110 is threadedly secured in lower plate 92. The fluid medium in the cylinder may be hydraulic or gas or a combination thereof. A bellows 120 extends between the lower plate 92 and lower cap 100 to act as a dust cover for the exposed portion of piston rod 110. Upper plate 108 has a central opening 121 (FIG. 9) through which the cylinder 82 is journaled for relative axial movement.

Figure 2B:
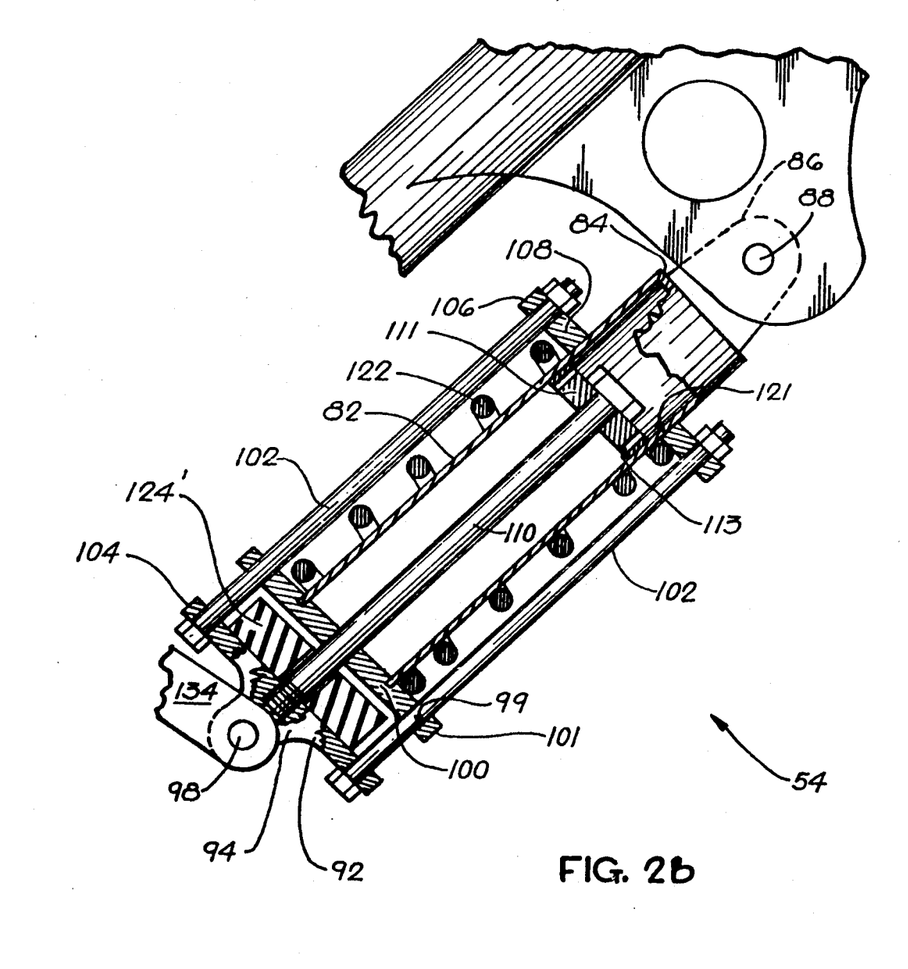
FIG. 2B is a fragmentary enlarged view similar to FIG. 2, showing a modified form of shock absorber with a rubber bumper instead of an inner spring bumper.

A main spring 122 is provided externally of the cylinder 82, inside the tie bolts 102. This spring is compressibly interposed between the upper plate 108 and lower cap 100. An auxiliary, anti-bottoming compression coil spring 124 may be provided internally of the cylinder 82 but is not essential. Alternatively, an annular, rubberlike bumper 124' may be positioned between the lower plate 92 and lower cap 100, instead of the inner spring 124, as shown in FIG. 2B. Preloading of main spring 122 is provided by adjusting the lengths of tie bolts 102.

A double-pivoted adjustment bolt link 136, best shown in FIGS. 2, 6, 7 and 10, provides an adjustable connection between the connecting and guiding means 56 and the chain stays 60,60. Link 136 comprises coupler blocks 164 and 166 with opposite hand internal threads 162 and 160 respectively, and an adjustment bolt 146 having opposite hand threads in sections 150 and 148. Locknuts 170,170 hold a selected length adjustment. Bolt 146 has a wrench-engageable center hex section 168. Blocks 164 and 166 have transverse bores 171, 171 for pivoted connections to be described. Alternatively a single piece link (not shown) may be provided if no length adjustment is described.

Figure 5:
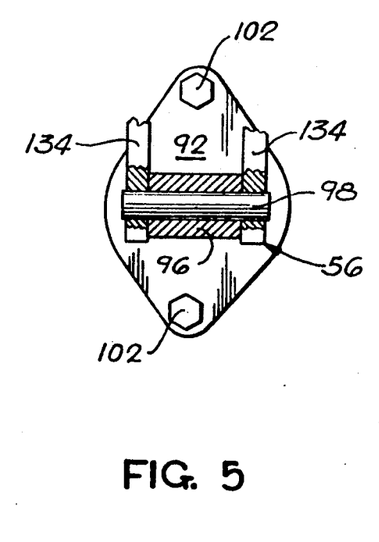
Figure 10:
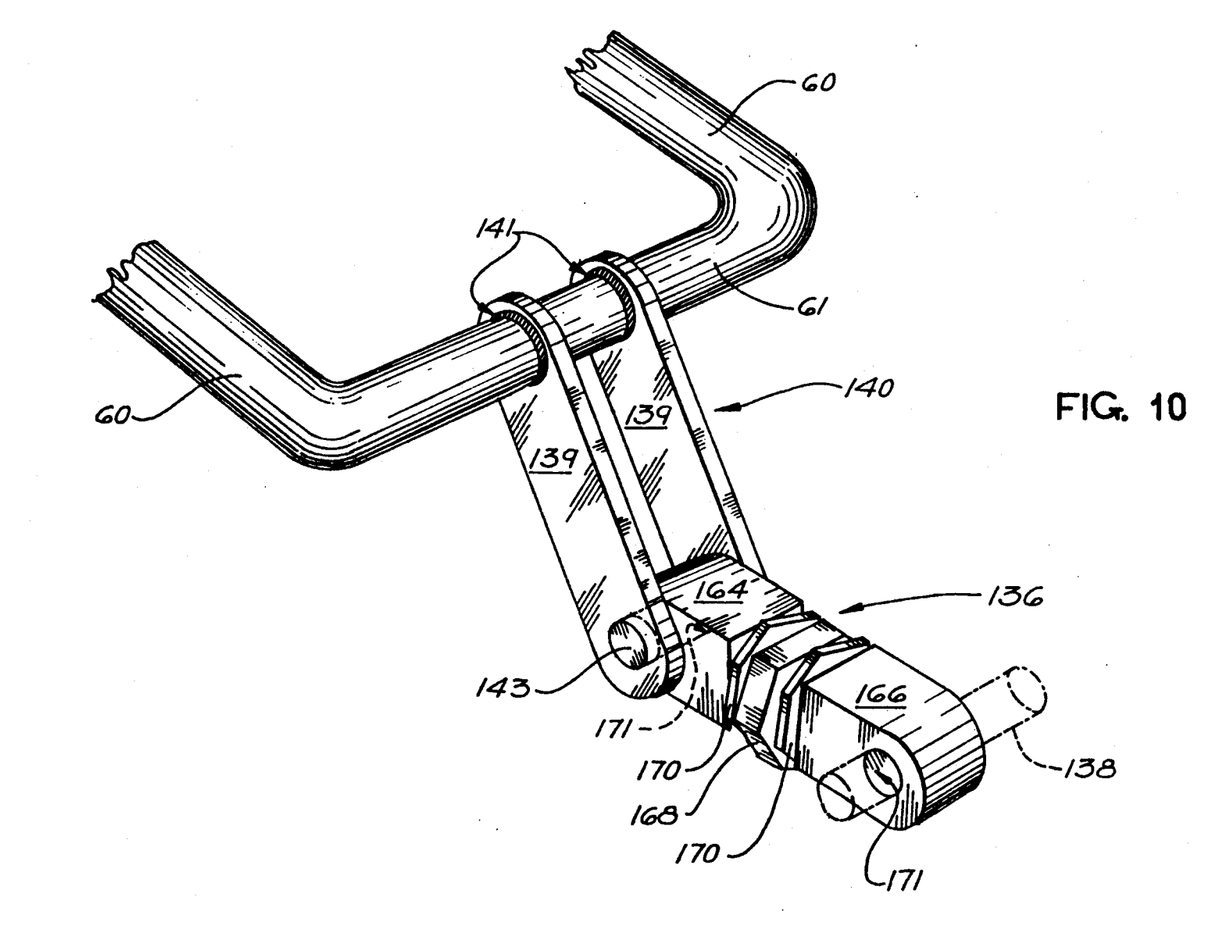
FIG. 10 is a fragmentary, enlarged perspective view of the forward end portion of the chain stay assembly, and the double-pivoted adjustable link shown in FIGS. 2, 3 and others.
Figure 11:
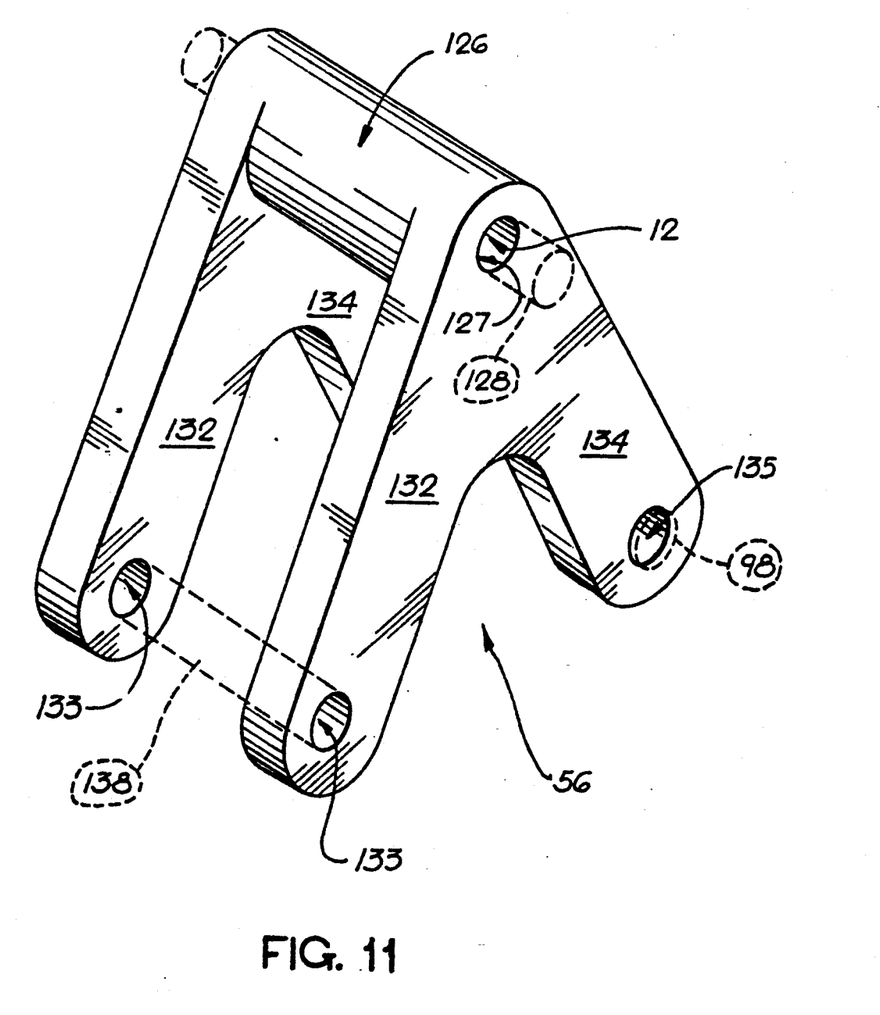
FIG. 11 is an enlarged, perspective view of a bell rank illustrating one form of connecting and guiding mechanism employed in the invention.

The connecting and guiding means generally designated 56 comprises a bell crank at the bottom of the main frame connected between the shock absorber assembly 54 and the double-pivoted link 136. As best shown in FIGS. 2, 4, 5 and 11, the bell crank 56 has a transverse, central or apex portion 126 with a bore 127 journaled on a pivot pin 128 supported between a pair of brackets 130 secured beneath the bottom bracket shell 32. As best shown in FIG. 11, the bell crank 56 has two pairs of angularly divergent arms 132 and 134 forming an integral unit with transverse central portion 126. Arms 134, 134 have bores 135 which are pivotally connected to the opposite sides of shock absorber draw bar extension 96 by pin 98 (FIGS. 2, 5 and 11). Arms 132, 132 have bores 133 and are pivotally connected to the opposite sides of adjustment link block 166 by a pin 138 (FIGS. 2, 4, 8 and 10).

As stated, the pivotable rear frame assembly 52 comprises a pair of rigid chain stays 60, 60. These are rigid longitudinal struts and comprise transversely rigid tubes or rods of metal or of a suitable metal or composite material interconnected at their forward ends into an integral U-shape by a transverse rod section 61 (FIG. 10). They are secured as by welding, solder, or adhesive to the corresponding rear fitments 62 at each end of the rear axle 70. There is a predetermined, fixed angle F (FIG. 2) between each swing arm 58 and corresponding chain stay 60.

As best shown in FIGS. 1 and 10 the chain stays 60 are generally L-shaped having a transversely offset, front dog leg portion generally designated 140 to clear the lower reach 142 of the drive chain 144. As best shown in FIG. 10, the dog leg portion 140 comprises a pair of transverse, offset brackets 139,139 secured as by welding or brazing at 141 to the transverse chain stay section 61. The rear coupler block 164 is pivotally connected to the bottom ends of brackets 139 by a pivot pin 143.

Figures 6, 7:
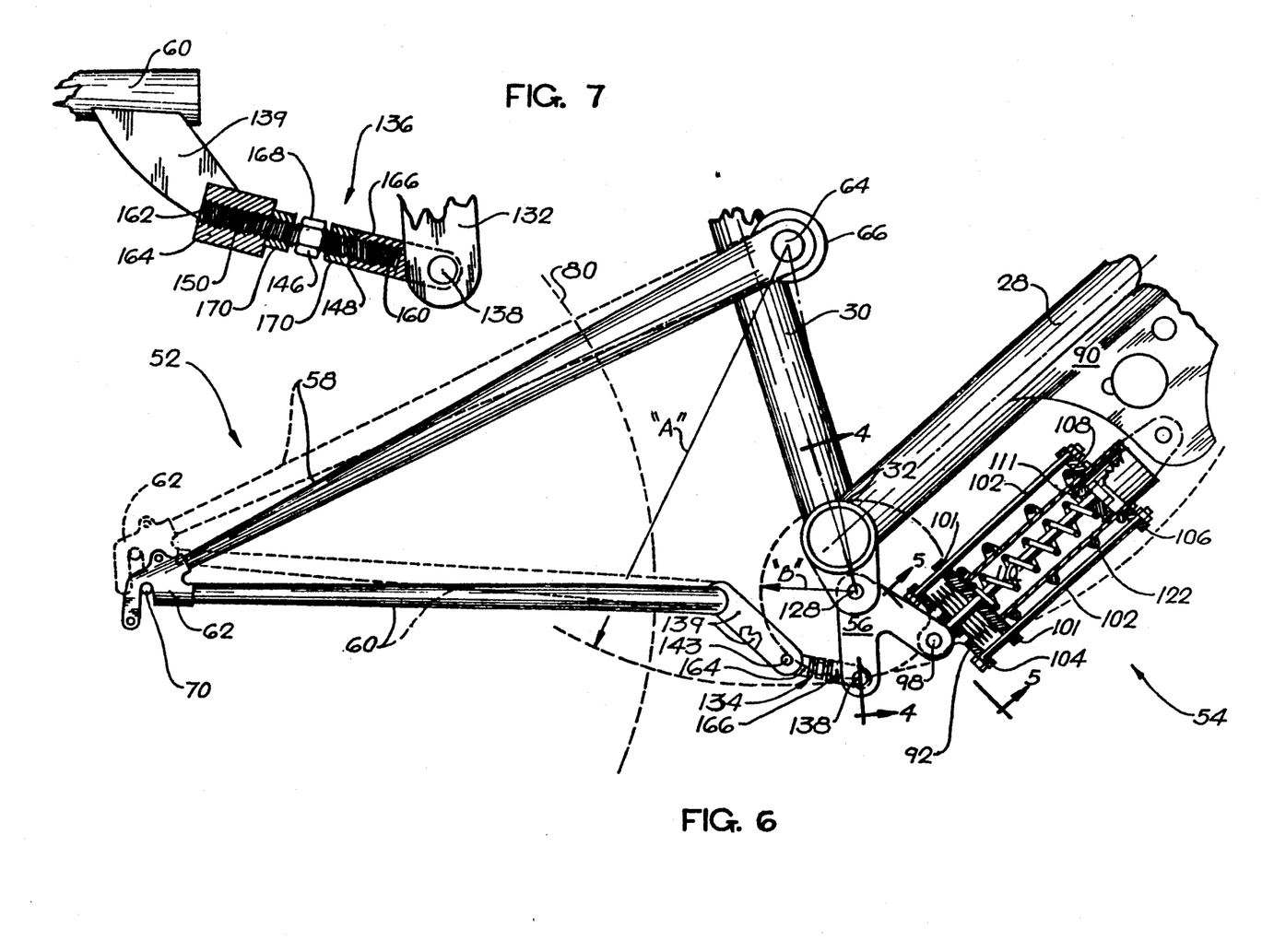
Figure 8:
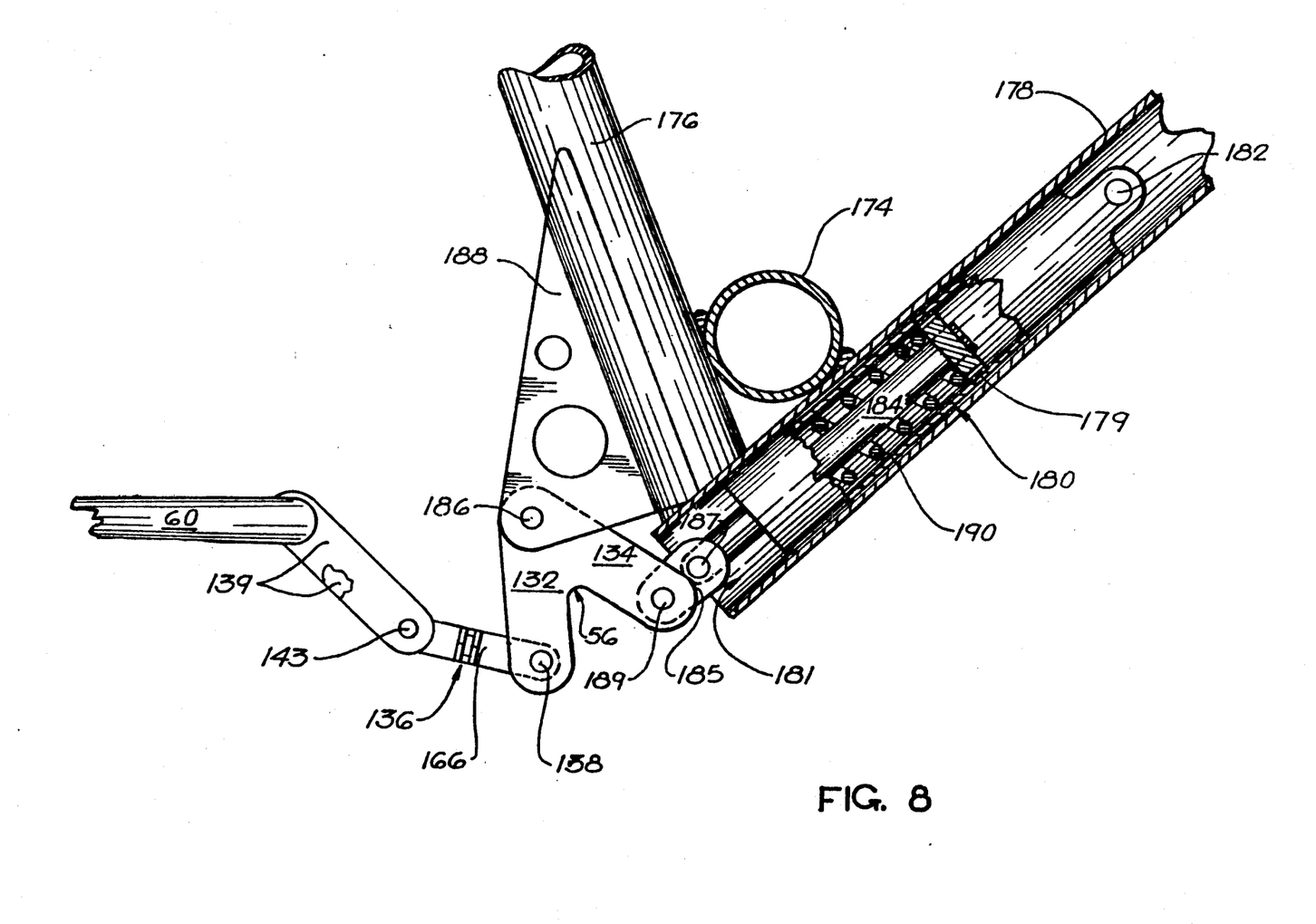
FIG. 8 is a fragmentary view similar to FIG. 1 showing an alternative embodiment of the invention.

The adjustment bolt 146 can be rotated by its hex section in one direction or the other to raise or lower the rear frame assembly by moving it between the solid line and broken line positions shown in FIG. 6. This adjusts the rear suspension system to accommodate different size riders. An alternative embodiment in which a long, thin shock absorber assembly is positioned within a rear-open-ended down tube is shown in FIG. 8. In this embodiment, a bottom bracket shell 174 is secured as by welding between a seat tube 176 and an open-bottomed down tube 178. A shock absorber assembly 180 is anchored at its upper forward end within the down tube by a bolt 182. A rearwardly and downwardly extending coupler or piston rod 184 extends through the open rear end 181 of the down tube and is connected via bell crank 56 and adjustment linkage 136 to chain stays 60 in the manner described in connection with the previous embodiment. In the embodiment shown in FIG. 8, a second link 185, in addition to link 136, is pivotally connected between pivot pins 187 and 189 on the coupler 184 and bell crank arm 134, respectively, to compensate for their different directions of movement. The bell crank 56 in FIG. 8 is pivotally mounted on a pin 186 which is secured between a pair of brackets 188 welded on the back side of seat tube 176. Main spring 190 engages the underside of piston 179 and urges the piston rod 184 upwardly and forwardly and functions in the manner described for main spring 122 in shock absorber assembly 54.

An important relationship is shown in FIGS. 2 and 3. Note that an arc A struck from the center of swing arm pivot pin 64 coincides with arc B struck from the pivot anchor pin 128 of bell crank arms 132 at the pin connection 138 only in the unloaded position of FIG. 2.

When a rider strikes a sudden elevation, the upward impact load exerted by rear axle 70 swings the rear suspension upwardly to some position such as that illustrated in FIG. 3. Note, in FIG. 3, that connecting pin 138 follows arc B upwardly along a line that diverges substantially from the line generated by arc A. This divergence in accommodated by the freely swinging movement of double-pivot link 136 without applying any bowing stresses to the chain stays 60. As one example, in a prototype of this invention, the radius of Arc "A" was 10-5/32" and the radius of Arc "B" was 3-5/16". The distance between the centers of axle 70 and pin 138 was approximately 1/16" less in FIG. 3 than in FIG. 2. This difference is accommodated by swinging of link 136. At the same time, the length of the shock absorber assembly increased from E=6" in FIG. 2 to E'=8.0" in FIG. 3.

The novel rear suspension will flex softly under light impacts, and more firmly in smaller and smaller increments with larger and larger impacts. This enables the suspension to react softly with light impacts and firmly with heavier impacts, without ever bottoming except under the most severe impacts which will be absorbed by the inner spring 124 or the elastic bumper 124'.

Use and operation are believed apparent from the preceding detailed description. Briefly, assume first that the bicycle is not loaded or is only very lightly loaded and the rear suspension initially takes the configuration shown in FIGS. 1 and 2. The main shock absorber spring 122 is only lightly compressed and the swing arms 58, 58 and chain stays 60, 60 are in the positions illustrated in FIG. 2.

Next, assume a rider mounts the bicycle. His weight causes the rear frame assembly 52 to deflect upwardly relative to the main frame to a position somewhere between the positions shown in FIGS. 2 and 3, for example to the broken line position shown in FIG. 6, with the main shock absorber spring slightly compressed.

Now assume the rear wheel strikes a substantial bump such as a brick lying in the roadway, or a pothole or curb. The heavy impact drives the rear axle 70 upwardly a distance to the position shown in FIG. 3 with the rear end of the swing arms 58 and chain stays 60 displaced upwardly corresponding amounts. The impact load is absorbed by the compression of main spring 122. The rate of upward movement of the piston rod 110 and draw bar 96, and downward rebound are damped by piston orifices 113.

While particular examples of the present invention have been shown and described, changes and modifications may be made without departing from the basic invention. Accordingly, the aim of the appended claims is to cover all such changes and modifications which are included within the spirit and scope of the invention.

The embodiments of the invention in which an exclusive property or privilege is claimed are defined as follows:

1. A rear suspension system for a cycle having a main frame, said suspension system comprising:
   a pivotable rear frame assembly including at least one elongated swing arm pivotally connected at the front end thereof to the main frame and having means at its rear end for supporting a rear wheel for up and down movement relative to the main frame, said rear frame assembly also including at least one elongated, forwardly extending substantially rigid chain stay having the rear end thereof connected to the rear end of the swing arm and movable therewith;
   a shock absorber assembly supported on a front portion of the frame and having coupling means which is movable along an axis having a substantial vertical component for applying a load from the swing arm to the shock absorber assembly, said shock absorber assembly including a spring urging said coupling means in an upward direction and means dampening movement of said coupling means;
   a double-pivoted link having one end pivotally connected to the forward end of the chain stay means; and
   connecting and guiding means at the bottom of the main frame pivotally connecting the other end of the link to the coupling means enabling the coupling means to be movable downwardly against the urgence of the spring in response to upward pivotal movement of the rear frame assembly, said connecting and guiding means enabling the spring to move the coupling means upwardly in response to downward pivotal movement of the rear frame assembly; and
   whereby an upward, momentary impact load on the rear frame assembly displaces it upwardly and deflects the spring in a largely downward direction while said impact load is reacted through said spring as a largely downward force component on the main frame, and whereby further, movement of the rear frame assembly is dampened in at least one direction.

2. A rear suspension system according to claim 1 in which the connecting and guiding means and the double-pivoted link is movable with the rear frame assembly and with the coupling means.

3. A rear suspension system according to claim 1 in which the connecting and guiding means is a movable member pivotally connected respectively to the link and to the coupling means.

4. A rear suspension system according to claim 1 in which the connecting and guiding means is a bell crank pivotally mounted to the bottom of the main frame.

5. A rear suspension system according to claim 1 in which the chain stay comprises a transversely rigid rod which is fixedly angularly disposed relative to the swing arm, whereby energy from a momentary impact load on the rear frame assembly is absorbed primarily by deflection of the spring.

6. A rear suspension system according to claim 5 in which the rear end portion of the rod is upwardly offset from the forward end portion thereof to facilitate clearance with respect to a chain driving the rear wheel.

7. A rear suspension system according to claim 1 in which said main frame includes a down tube with a rearward opening and said shock absorber assembly and spring are disposed inside the down tube with said coupling means extending from said opening.

8. A rear suspension system according to claim 1 in which said link includes means for adjusting the length of the link to adjust the height of the rear frame assembly for different size riders.

9. A rear suspension system for a cycle, said cycle having a main frame including a rearwardly and downwardly extending down tube, a generally upright seat tube, and a bottom bracket shell, said suspension system comprising:
   a pivotable rear frame assembly behind the main frame including at least one elongated swing arm pivotally connected at its front end to the main frame, the swing arm having means at the rear end for supporting a rear wheel for up and down movement relative to the main frame, said rear assembly also including at least one elongated chain stay extending forwardly from the rear end of the swing arm and being movable therewith;
   a shock absorber assembly supported by the down tube and having a coupling means which is movable along an axis parallel to the down tube for applying a load from the swing arm to the shock absorber assembly, said shock absorber assembly including a spring urging said coupling means in a forward and upward direction along the down tube, and means for dampening movement of said coupling means;
   a double-pivoted link having one end pivotally connected to the forward end of the chain stay; and
   connecting and guiding means pivotally connecting the other end of the link to the coupling means on the underside of the main frame;
   whereby an upward impact load on the rear frame assembly displaces it upwardly and deflects the spring in a direction having a downward force component on the main frame, and whereby further, movement of the rear frame assembly is dampened.

10. A rear suspension system according to claim 9 in which the chain stay comprises a pair of substantially rigid rod-like members which are fixedly angularly disposed relative to the swing arm, whereby energy from an upward impact load on the rear frame assembly is absorbed primarily by the spring.

11. A rear suspension system according to claim 10 in which the rod like members have at the front end thereof transversely offset portions to provide clearance relative to a drive chain for the rear wheel.

12. A rear suspension system according to claim 9 in which the connecting and guiding means is flexibly connected to the coupling means.

13. A rear suspension system according to claim 9 in which the connecting and guiding means is pivotally connected to the coupling means.

14. A rear suspension system according to claim 13 in which the connecting and guiding means is flexibly connected to and guided by the main frame.

15. A rear suspension system according to claim 13 in which the connecting and guiding means is flexibly connected to the underside of the bottom bracket shell.

16. A rear suspension system according to claim 13 in which the connecting and guiding means is pivotally connected to the main frame.

17. A rear suspension system according to claim 13 in which the connecting and guiding means is pivotally connected to the bottom bracket shell.

18. A rear suspension system according to claim 9 in which the connecting and guiding means is pivotally connected to the main frame and has arms pivoted respectively to the link and to the coupling means.

19. A rear suspension system according to claim 9 in which the down tube has a rearwardly open end, the shock absorber assembly is disposed therein, and the coupling means extends from said rearwardly open end.

20. A rear suspension system for a cycle, said cycle having a main frame including a down tube, a seat tube, and a bottom bracket shell, said suspension system comprising:
   a pair of rearwardly extending swing arms pivotally connected at their front ends to opposite sides of said main frame, each swing arm having at its rear end a rear fitment adapted to support a rear wheel for up and down movement relative to the frame;
   a tubular shock absorber assembly supported by the down tube and having a linearly movable coupling means extending rearwardly and downwardly therefrom for applying a load from the swing arm to the shock absorber assembly, said shock absorber assembly including a spring urging said coupling means in a forward and upward direction, and means dampening movement of said coupling means in at least one direction;
   a pair of elongated chain stays, each extending forwardly from a corresponding one of said rear fitments; and
   a bell crank having an apex portion pivotally mounted on the underside of the frame and having two angularly spaced arms, one of said arms being pivotally connected to said coupling means, the other said arms being pivotally connected to one end of a double pivot link, the other end of said link being pivotally connected to the forward ends of the chain stays;

whereby upward movement of the chain stays with the swing arms moves the coupling means of the shock absorber assembly through the link and the bell crank and such movement is resisted by longitudinal deflection of the spring, whereby movement of said swing arms is dampened in at least one direction, and whereby further upward force on said swing arms is reacted through said spring and chain stays as a largely downward force on the frame.

21. A rear suspension system according to claim 20 in which the chain stays have transversely offset portions at the forward ends thereof to clear a drive chain connected to drive the rear wheel.

22. A rear suspension system according to claim 21 in which the chain stays comprise substantially rigid longitudinal struts.

23. A rear suspension system according to claim 20 in which the shock absorber assembly is supported on the forward side of the down tube.

24. A rear suspension system according to claim 20 in which the down tube has a rearwardly open end, the shock absorber assembly is disposed therein and the coupling means thereof extends from said rearwardly open end.

25. A rear suspension system according to claim 20 in which the swing arms and chain stays are rigidly connected to corresponding rear fitments at a fixed angle.

* * * * *

UNITED STATES PATENT AND TRADEMARK OFFICE
CERTIFICATE OF CORRECTION

PATENT NO. : 5,226,674
DATED : July 13, 1993
INVENTOR(S) : Erik F. Buell & Marc Muller It is certified that error appears in the above-identified patent and that said Letters Patent is hereby corrected as shown below:

Col. 3, line 8, delete "rank" and insert -- crank --;

Col. 6, lin3 55, delete "means";

Col. 8, line 8, delete "fear" and insert -- rear --;

Col. 8, line 11, change "rod like" to -- rod-like --.

Signed and Sealed this

Fifteenth Day of February, 1994

Attest:

BRUCE LEHMAN

Attesting Officer     Commissioner of Patents and Trademarks